United States Patent
Carlevaris et al.

(10) Patent No.: US 11,685,187 B2
(45) Date of Patent: Jun. 27, 2023

(54) LIGHT-WEIGHT WHEEL HUB FOR A WHEEL HUB ASSEMBLY

(71) Applicant: Aktiebolaget SKF, Gothenburg (SE)

(72) Inventors: Alberto Carlevaris, Turin (IT); Giorgio Missiaggia, Trieste (IT); Stefano Richaud, San Secondo di Pinerolo (IT)

(73) Assignee: Aktiebolaget SKF

( * ) Notice: Subject to any disclaimer, the term of this patent is extended or adjusted under 35 U.S.C. 154(b) by 0 days.

(21) Appl. No.: 17/315,763

(22) Filed: May 10, 2021

(65) Prior Publication Data
US 2021/0354509 A1    Nov. 18, 2021

(30) Foreign Application Priority Data
May 15, 2020   (IT) .................. 102020000011143

(51) Int. Cl.
*B60B 27/00*    (2006.01)
*F16C 33/58*    (2006.01)

(52) U.S. Cl.
CPC ...... *B60B 27/0094* (2013.01); *B60B 27/0005* (2013.01); *F16C 33/585* (2013.01); *F16C 33/588* (2013.01); *B60B 2360/141* (2013.01); *F16C 2223/10* (2013.01); *F16C 2240/60* (2013.01); *F16C 2326/02* (2013.01)

(58) Field of Classification Search
CPC .. F16C 33/585; F16C 33/588; F16C 2223/10; F16C 2240/60; F16C 2326/02; B60B 27/0005; B60B 27/0094; B60B 2360/141
See application file for complete search history.

(56) References Cited

U.S. PATENT DOCUMENTS

| | | | |
|---|---|---|---|
| 2006/0182379 A1* | 8/2006 | Grell | F16C 33/64 384/569 |
| 2008/0247701 A1 | 10/2008 | Kapaan | |
| 2011/0187179 A1 | 8/2011 | Zwarts et al. | |
| 2012/0112521 A1* | 5/2012 | Beyfuss | F16C 35/067 301/110 |

FOREIGN PATENT DOCUMENTS

| | | | | |
|---|---|---|---|---|
| EP | 2965922 | | 1/2016 | |
| JP | 2007278518 A | * | 10/2007 | ............ F16C 19/185 |
| JP | 2009002369 A | * | 1/2009 | ............ F16C 19/184 |
| JP | 2012056528 A | * | 3/2012 | ............ F16C 19/186 |
| JP | 2012132568 A | * | 7/2012 | ............ F16C 19/184 |
| WO | 2010012283 | | 2/2010 | |
| WO | 2010133233 | | 11/2010 | |

OTHER PUBLICATIONS

Machine Translation of JP-2007278518-A (Year: 2007).*
Machine Translation of JP-2009002369-A (Year: 2009).*
Machine Translation of JP-2012056528-A (Year: 2012).*
Search Report for corresponding Italy Patent Application No. 102020000011143 dated Jan. 11, 2021.

* cited by examiner

*Primary Examiner* — Alan B Waits
(74) *Attorney, Agent, or Firm* — Reed Smith LLP

(57) ABSTRACT

Wheel hubs for a motor-vehicle wheel hub assemblies provided with a bearing unit in turn which include at least one row of rolling bodies, the wheel hub being provided with at least two sheet-metal elements which are rigidly joined together, wherein a first sheet-metal element forms a raceway for the at least one row of rolling bodies.

11 Claims, 3 Drawing Sheets

US 11,685,187 B2

LIGHT-WEIGHT WHEEL HUB FOR A WHEEL HUB ASSEMBLY

CROSS-REFERENCE RELATED APPLICATION

This application is based on and claims priority to Italian Patent Application No. 102020000011143 filed on May 15, 2020, under 35 U.S.C. § 119, the disclosure of which is incorporated by reference herein.

FIELD

The present invention relates to a light-weight wheel hub for a wheel hub assembly provided with a bearing.

BACKGROUND

Wheel hub assemblies provided with a bearing unit for rotatably supporting a wheel of a vehicle on a suspension are known and commonly used. Such bearing units, in general, include a pair of rolling bearings. A variety of different configurations of a bearing unit are known.

BRIEF DESCRIPTION OF THE DRAWINGS

Certain non-limiting exemplary embodiments will now be described with reference to the accompanying drawings, in which.

DETAILED DESCRIPTION

Figure 1:
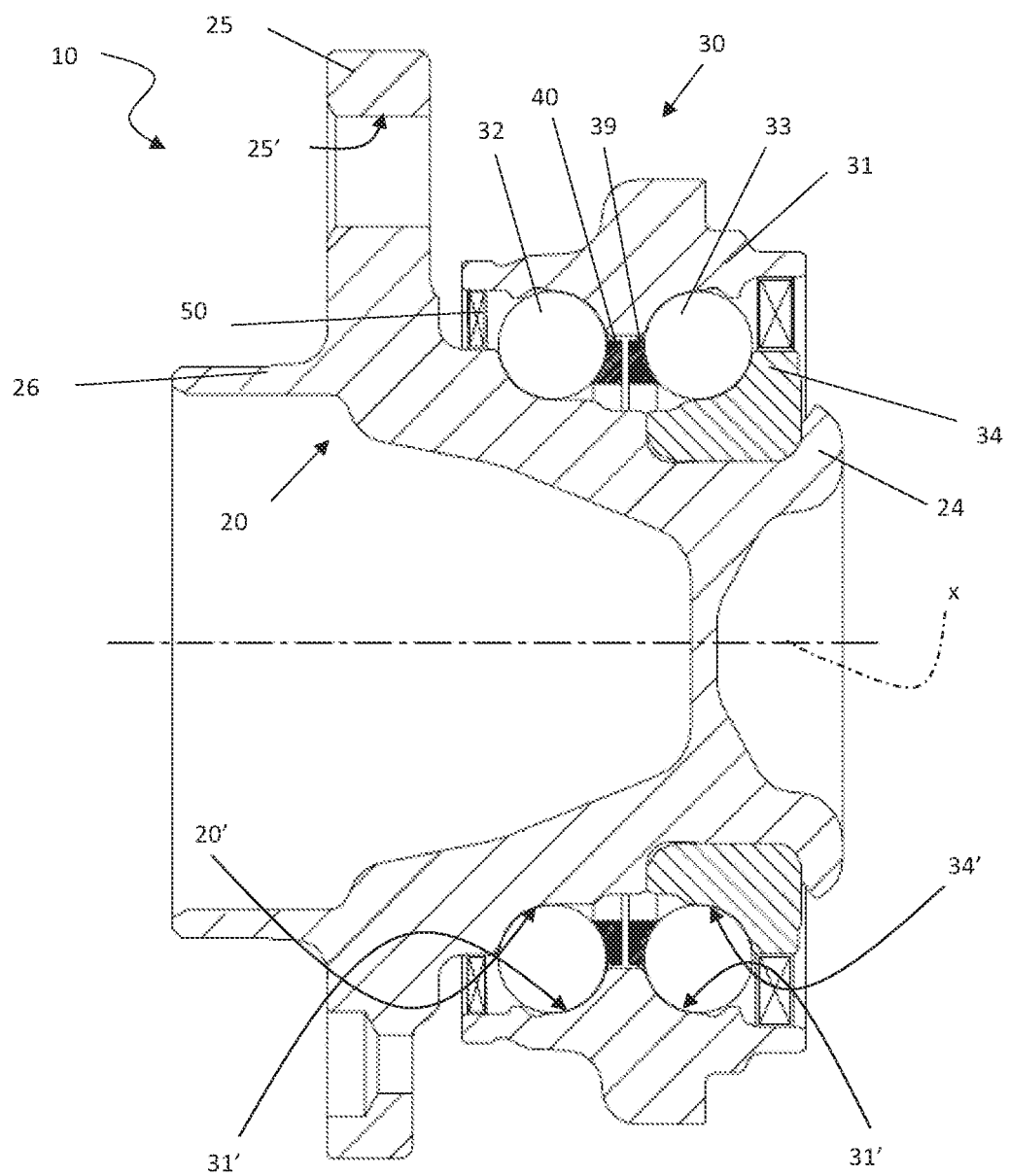
FIG. 1 is a cross-section through a wheel hub assembly provided with a bearing unit.

One object of the present disclosure is to provide a light-weight wheel hub for a wheel hub assembly. This object is achieved by manufacturing a wheel hub not as a single piece obtained by means of hot-forging, but as an assembly of two or more sheet-metal elements which are rigidly joined together.

This results in a significant reduction in weight, optimization in terms of use of material, elimination of forging processes and, consequently, a significant reduction in costs.

Embodiments of a wheel hub use material only where necessary for functional and structural reasons. In the case of a wheel hub assembly, this means using steel only on the surfaces making contact with the rolling bodies and at the same time obtaining a "box-shaped" structure which has the required structural strength for a given application. In this way, weight is reduced without reducing the strength of an assembly.

In order to manufacture embodiments of a wheel hub a radically different production process is used: hot-forging processes are eliminated and at least two metal sheets are initially used to obtain the correct form by means of plastic deformation operations (bending, deep-drawing, etc.). In order to obtain the final form of a wheel hub, it is possible to operate in different ways, using two or more sheet-metal elements which are rigidly joined together by means of welding, gluing or other similar methods. In this way it is possible to obtain many types of rings for bearings, such as inner and outer rings for many applications of bearings or flanged inner rings for motor vehicle applications.

Therefore, according to the present invention a wheel hub for a wheel hub assembly having the characteristic features illustrated in the independent claim, attached to the present description, is provided.

Further preferred and/or particularly advantageous embodiments of the invention are described in accordance with the characteristic features indicated in the attached dependent claims.

Bearing units in accordance with this disclosure may comprise a pair of rolling bearings, for rotatably supporting a wheel of a vehicle mounted on a suspension. In particular, the present disclosure relates to a wheel hub realized by means of a plurality of sheet-metal elements rigidly joined together.

The solutions realized by this disclosure may be applied to all generations of wheel hub assemblies. In particular, such applications include both the case where the outer ring of the bearings is rotatable, while the inner rings of the bearing are fixed, and the opposite case where the inner rings rotate and the outer ring is fixed. Embodiments in accordance with this disclosure are also suitable for any type of rolling body (balls, rollers, tapered rollers, etc.).

Furthermore, embodiments in accordance with this disclosure may be employed in a light-weight wheel hub.

Exemplary wheel hub assemblies may comprise a rotatable hub provided with a coupling for engaging a rotating element of the motor vehicle, for example the wheel or the disc of a braking element. Such bearing units comprise an outer ring, one or more of inner rings, one of which may be the hub itself, and a plurality of rolling bodies, e.g., balls, rollers or tapered rollers or the like. All these components have an axial symmetry with respect to the axis of rotation of the rotating elements, for example a wheel hub and inner rings of a bearing unit.

Also, as a result of the ever-increasing global competition, there is a constant demand by, e.g., motor vehicle manufacturers, for continuous technical or cost-related improvements to wheel hub assemblies. In particular, there is a constant demand for a reduction in weight of an entire unit, an improved use of materials, as well as a machining process with a smaller environmental impact (e.g., by eliminating the hot-forging process). Obviously all of this is ideally accompanied by a reduction in the costs.

It is therefore necessary to define a suitable solution of a wheel hub assembly which is not affected by the aforementioned drawbacks.

By way of a non-limiting example, exemplary wheel hub assemblies will be described in referent to an application for motor vehicles provided with a bearing unit.

With reference to FIG. 1, 10 denotes in its entirety a wheel hub assembly according to a preferred embodiment of the invention. FIG. 1 shows details of an example of a configuration.

Wheel hub assembly 10 has a central axis of rotation X and comprises a wheel hub 20 which is, preferably, but not necessarily, rotatable, shown for the sake of simplicity in FIG. 1 as a single element, but embodiment include at least two elements which are separate and rigidly joined together, a more detailed description thereof being provided below. Wheel hub unit 10 also includes a bearing unit 30 in turn made of a radially outer ring 31, preferably, but not necessarily stationary; a radially inner ring 20 defined by the hub 20; a further radially inner ring 34 mounted rotatable on and integral with the hub 20; two rows of rolling bodies 32, 33, in this example balls, arranged between the radially outer ring 31 and the radially inner rings 20 and 34; and two cages 39, 40 for containing and keeping in position the rolling bodies of the rows of rolling bodies 32, 33.

In the whole of the present description and in the claims, the terms and the expressions indicating positions and orientations such as "radial" and "axial" are understood as referring to the central axis of rotation X of the bearing unit 30. Expressions such as "axially outer" and "axially inner" instead relate to the assembled condition of the wheel hub assembly and, in the case in question preferably relate, respectively, to a wheel side and to a side opposite to the wheel side.

A radially outer ring 31 may be provided with two respective radially outer raceways 31', while radially inner rings 20, 34 may be provided with respective radially inner raceways 20', 34' for allowing rolling of the axially outer row of rolling bodies 32 arranged between the radially outer ring 31 and the hub 20, and the axially inner row of rolling bodies 33 between the radially outer ring 31 and the radially inner ring 34. For the sake of simpler graphical illustration the reference numbers 32, 33 will be attributed both to the individual balls and to the rows of balls. Again for the sake of simplicity, the term "ball" may be used by way of example in the present description and in the attached drawings instead of the more generic term "rolling body" (and likewise the same reference numbers will be used).

A wheel hub 20 defines at its axially inner end a rolled edge 24 which is configured to prestress axially the inner ring 34. Such a wheel hub 20 has, moreover, an axially outer flanged portion 25. A flanged portion has a plurality of axial fixing holes 25'. These holes are the seats for corresponding fixing means (for example stud bolts, not explicitly shown) which connect in a known manner a part of the motor vehicle wheel, for example the non-driving wheel or the brake disc (also known and not explicitly shown), to the wheel hub 20. Preferably, the hub 20 has an axially outer cylindrical portion 26 which acts as a centring means for the part of the motor vehicle wheel.

A wheel hub assembly 10 may also be provided with sealing means 50 for sealing off the bearing unit from the external environment.

Figure 2:
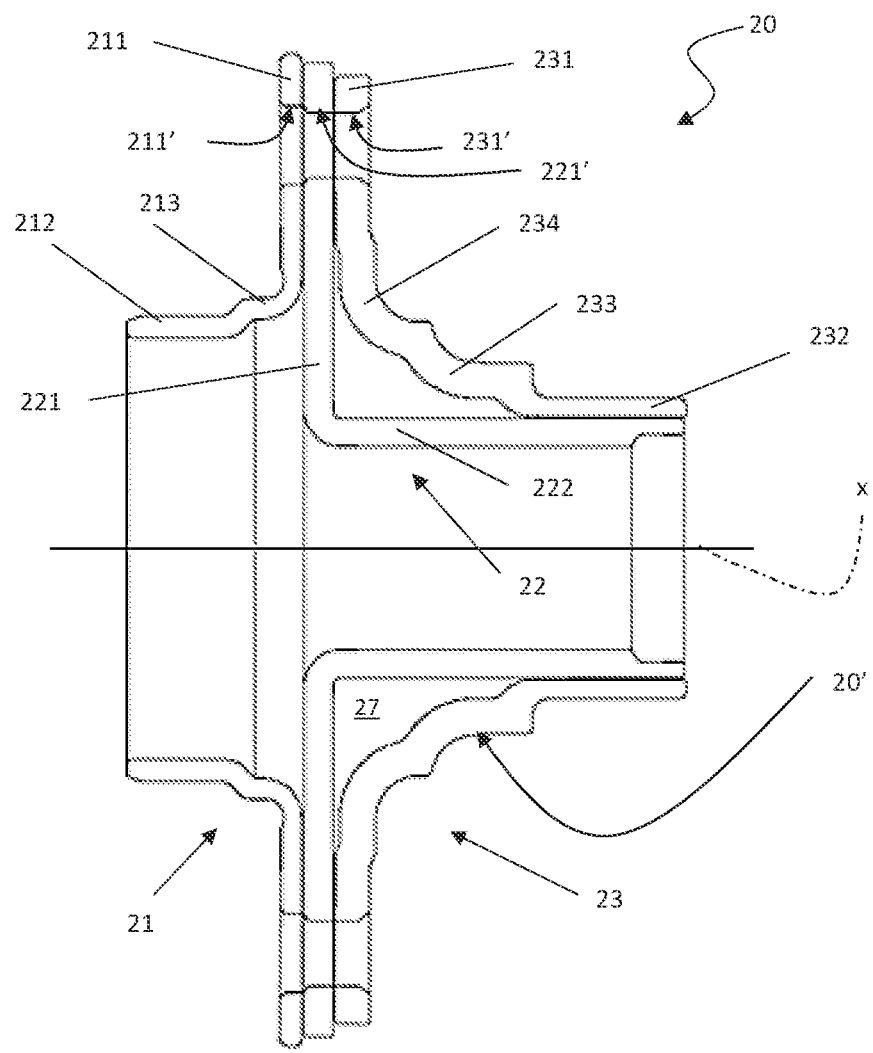
FIG. 2 shows the wheel hub of the wheel hub assembly according to FIG. 1 in first exemplary embodiments.

FIG. 2 shows in detail a wheel hub 20 in first embodiments which envisages the use of three sheet-metal elements 21, 22, 23, all with a tubular flanged shape. More particularly, starting from the axially inner side, a wheel hub 20 is formed by a first sheet-metal element 23 which in turn has a radially outer annular portion 231 which is used to form the flanged portion 25 of the wheel hub 20 and is provided with a plurality of holes 231' which are used to form the axial fixing holes 25'; an axially inner cylindrical portion 232 which, if required by the application, is used to form the rolled edge 24; a first intermediate portion 233, with a mixed radially outer and axially inner development, which is situated adjacent to the cylindrical portion 232 and axially on the outside thereof and which forms the raceway 20' with its radially outer surface; finally a second intermediate portion 234, connecting together the first intermediate portion 233 and the cylindrical portion 231.

It is clear that the main function of the first sheet-metal element 23 is that of forming the raceway 20' directly on a sheet-metal element (in particular, on the first intermediate portion 233) rather than on a part obtained by forging, as in the prior art. A raceway requires a high surface hardness, typically from 58 HRC to 62 HRC, and this must be ensured on a sheet-metal element 23. Advantageously, element 23 may be made of such steel as may is used for motor vehicle bearings. Such a material may be subjected to local induction-hardening treatment in a zone which includes the raceway 20'. A hardening depth, that allows for the raceway 20' to perform its functions without being deformed, must be between 50% and 70% of the thickness of a sheet-metal element 23. In some embodiments, a hardening depth is preferably equal to 60%. A thickness of a first sheet-metal element 23 may be between 3 mm and 7 mm depending on the application. In some embodiments, a thickness of a first sheet-metal element 23 is typically 5 mm. This thickness is equal to that of annular portion 231 and also that of first intermediate portion 233 and second intermediate portion 234. Cylindrical portion 232, since it does not have to withstand large structural loads and, in some embodiments, must be able to be deformed in order to form the rolled edge 24 where necessary, may have a thickness of even less than 50%, e.g., between 1.5 mm and 3.5 mm.

A wheel hub 20 further may further comprise a second sheet-metal element 22 which in turn has a radially outer annular portion 221 used to form a flanged portion 25 of a wheel hub 20 and is provided with a plurality of holes 221' which are used to form axial fixing holes 25'; and an axially inner cylindrical portion 222 connected to the annular portion 221.

Advantageously, also a second sheet-metal element 22 may be made of steel of the type used for motor vehicle bearings, but differently from first sheet-metal element 23, it does not require surface-hardening. A thickness of a the second sheet-metal element 23 may be between 3 mm and 6 mm depending on the application. In certain exemplary embodiments, the thickness may be typically 4 mm.

A wheel hub 20 comprises a third sheet-metal element 21 which in turn has: a radially outer annular portion 211 which is used to form a flanged portion 25 of the wheel hub 20 and is provided with a plurality of holes 211' which are used to form axial fixing holes 25'; an axially outer cylindrical portion 212, which performs the function of means for centring a part of a motor vehicle wheel, for example a non-driving wheel or a brake disc; an intermediate portion 213 for connecting together annular portion 211 and cylindrical portion 212.

Advantageously, also third sheet-metal element 21 may be made of steel used for motor vehicle bearings, but differently from a first sheet-metal element 23, it does not require surface-hardening. A thickness of the third sheet-metal element 21 may be between 2 mm and 4 mm depending on the application. In certain exemplary embodiments, the thickness may be typically 3 mm.

In exemplary embodiments, three sheet-metal elements 21, 22, 23 are rigidly joined together by means of gluing, welding (for example continuous electric welding) or another joining system suitable for the purpose. Connections between sheet-metal elements may be made between the corresponding annular portions 211, 221, 231 and between the corresponding radially inner cylindrical portions 222, 232.

As may be noted, a box-shaped structure which circumscribes a cavity 27 may be formed between the first sheet-metal element 23 and the second sheet-metal element 22. Cavity 27 represents a savings in material, in particular steel, which is possible without negatively affecting the structural strength of a wheel hub, said strength for the same amount of material, being increased by the presence of a closed cross-section. In embodiments, sensors, for example revolution sensors, may be inserted or disposed inside a cavity 27. In otherwords, a cavity 27 may be used to hold or retain sensors or sensor systems. In some embodiments, applications, to increase the structural strength without dispensing with the savings in steel, a cavity 27 could be suitably filled with plastic material.

Figure 3:
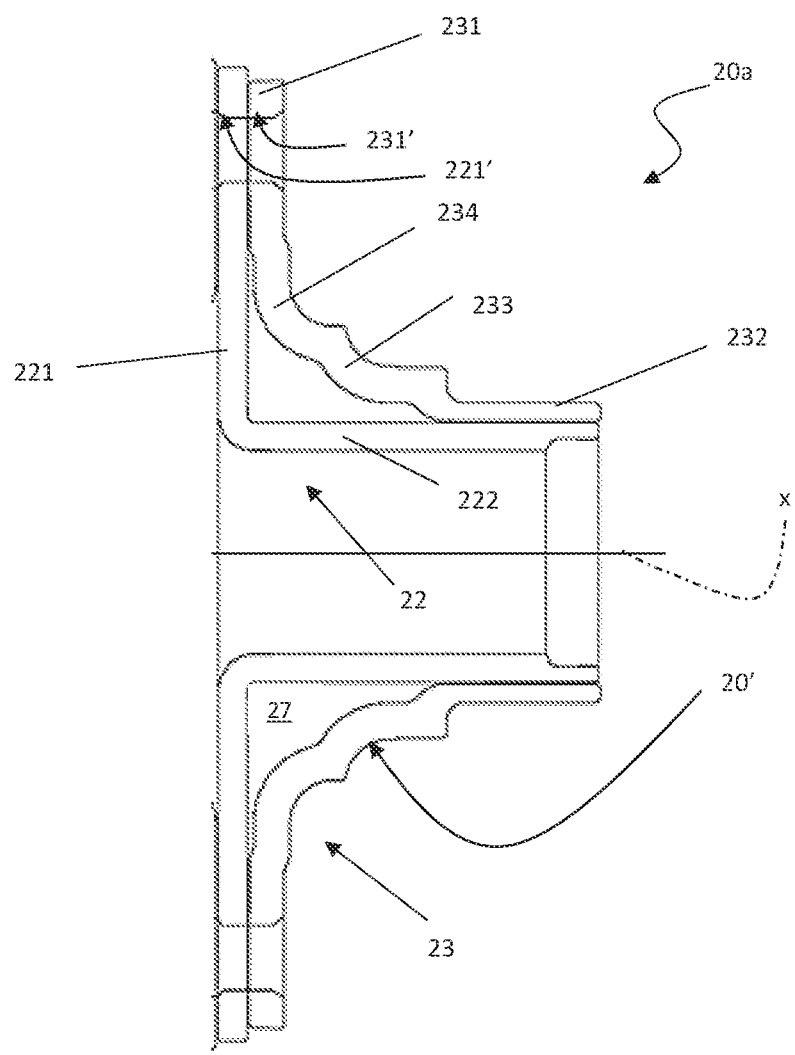
FIG. 3 shows the wheel hub of the wheel hub assembly according to FIG. 1 in second exemplary embodiments.

FIG. 3 shows a wheel hub 20*a* in second exemplary embodiments. Second exemplary embodiments envisages eliminating a third sheet-metal element 21. Therefore, wheel hub 20*a* comprises a first sheet-metal element 23 and a second sheet-metal element 22 which have the same characteristics as corresponding first and second sheet-metal elements of the wheel hub 20 shown in FIG. 2.

Without a third sheet-metal element, the thickness of the first sheet-metal element 23 may again be between 3 mm and 7 mm depending on the application, but generally will assume a value closer to upper value, typically 6 mm. A cylindrical portion 232, in certain exemplary embodiments, since it does not have to withstand large structural loads and, in some applications, must be able to be deformed in order to form the rolled edge 24 where necessary, may again have a thickness of between 1.5 mm and 3.5 mm.

Similarly, in certain exemplary embodiments, a thickness of the second sheet-metal element 22 may again be between 3 mm and 6 mm depending on the application, but generally will assume a value closer to the upper value, typically 5-6 mm.

Similarly, in exemplary embodiments, two sheet-metal elements 22, 23 are rigidly joined together by means of gluing, welding (for example a continuous electric weld) or another joining system suitable for the purpose. Connections between sheet-metal elements may be made between the corresponding annular portions 221, 231 and between the corresponding radially inner cylindrical portions 222, 232.

In this embodiment also, a box-shaped structure which circumscribes a cavity 27 and represents a savings in steel is formed between the first sheet-metal element 23 and the second sheet-metal element 22. Similarly, should it be required in any case to increase the structural strength, without dispensing with the savings in steel, cavity 27 could be suitably filled with plastic material.

As seen, wheel hubs are disclosed which use material (and heat treatment) only where it is necessary for functional and structural reasons. Accordingly creating exemplary wheel hubs do not require a hot-forging process. Rather at least two metal sheets are initially used and a desired form of the wheel hub is obtained by means of simply plastic deformation of the sheets. Sheet-metal elements are then rigidly joined together, using in this case also, ordinary technologies such as gluing, welding, and the like.

While disclosed in reference to wheel hub embodiments, it is clear that, using the same approach, it is possible to redesign many types of rings for bearings, such as radially inner rings and radially outer rings, as well as the small radially inner ring (i.e. that indicated by the reference number 34 in FIG. 1) which is coupled with the flanged hub according to the present invention. Exemplary embodiments 20 & 20*a* illustrated in FIGS. 2 and 3, and further described in reference to FIG. 1, provide a means for bearing a wheel hub.

The present invention therefore achieves the main advantages sought-after: a significant reduction in weight, optimization in terms of use of material, elimination of the forging process and, consequently, also a not insignificant reduction in the costs.

In addition to the embodiments described above, it must be understood that there exist numerous other variants. And in particular inventive wheel hubs are no constrained to the dimensions herein, and may also be employed in smaller, larger, and much larger wheel hubs. It must also be understood that these embodiments are only examples and do not limit either the scope of the invention, nor its applications, nor its possible configurations. On the contrary, although the description above allows the person skilled in the art to implement various embodiments of the present invention at least according to one of its examples of embodiment, it must be understood that many variants of the components described are possible, without thereby departing from the scope of the invention, as defined in the accompanying claims, interpreted literally and/or in accordance with their legal equivalents.

The invention claimed is:

1. A wheel hub for a wheel hub assembly for motor vehicles provided with a bearing unit, comprising:
   at least one row of rolling bodies,
   a flanged portion comprising a plurality of axial holes,
   at least two sheet-metal elements rigidly joined together,
      the at least two sheet-metal elements comprising a first sheet-metal element defining a raceway for the at least one row of rolling bodies, and a second sheet metal element,
   wherein the first sheet-metal element comprises:
      a radially outer annular portion configured to form the flanged portion; and
      an axially inner cylindrical portion;
   wherein the second sheet-metal element comprises:
      a radially outer annular portion configured to form the flanged portion, and
      an axially inner cylindrical portion directly contacting the axially inner cylindrical portion of the first sheet metal element.

2. The wheel hub of claim 1, wherein the at least two sheet-metal elements are three in number.

3. The wheel hub of claim 2, wherein the first sheet-metal element comprises:
   a first intermediate portion adjacent to the axially inner cylindrical portion;
   a second intermediate portion, which connects together with the first intermediate portion and the radially outer annular portion.

4. The wheel hub of claim 1, wherein the first sheet-metal element further comprises:
   a first intermediate portion adjacent to the axially inner cylindrical portion;
   a second intermediate portion, which connects together with the first intermediate portion and the radially outer annular portion.

5. The wheel hub of claim 1, wherein the first sheet-metal element has a hardening depth in the region of the raceway equal to between 50% and 70% of the thickness of the first sheet-metal element.

6. The wheel hub of claim 1, wherein the thickness of the first sheet-metal element is between 3 mm and 7 mm and the thickness of the second sheet-metal element is between 3 mm and 6 mm.

7. The wheel hub of claim 1, further comprising a third sheet-metal element comprising a radially outer annular portion, an axially outer cylindrical portion and an intermediate portion connecting together the annular portion and the cylindrical portion.

8. The wheel hub of claim 1, wherein the first sheet-metal element and the second sheet-metal element which are rigidly joined together form a structure which circumscribes a cavity.

9. The wheel hub of claim 8, wherein the cavity is filled with plastic material.

10. A wheel hub assembly comprising:
the wheel hub of claim 8 defining a radially internal ring which is rotatable, integral with and mounted on the wheel hub, the wheel hub assembly further comprising:
a radially outer ring,
two rows of rolling bodies, interposed between the radially outer ring and the radially inner ring, and
two containing cages for keeping in position the rolling bodies of the rows of rolling bodies.

11. A method of forming a bearing unit comprising:
providing a first sheet metal element defining a raceway and comprising an axially inner cylindrical portion, and a flange portion comprising a plurality of axial holes;
providing a second sheet metal element comprising an axially inner cylindrical portion, and a flange portion comprising a plurality of axial holes;
providing a third sheet metal element comprising an axially outer cylindrical portion, and a flange portion comprising a plurality of axial holes;
directly joining the flange portion of the first sheet metal element to the flange portion of the second sheet metal element;
directly joining the axially inner cylindrical portion of the first sheet metal element to the axially inner cylindrical portion of the second sheet metal element; and
directly joining the flange portion of the second sheet metal element to the flange portion of the third sheet metal element.

\* \* \* \* \*